United States Patent [19]

Jaeger et al.

[11] Patent Number: 4,980,648
[45] Date of Patent: Dec. 25, 1990

[54] LOCAL OSCILLATOR SIGNAL PHASE ACQUISITION SYSTEM FOR DIGITAL DEMODULATOR

[75] Inventors: Kevin A. Jaeger, Petaluma; Patrick K. Walp, Penngrove, both of Calif.

[73] Assignee: AMP Incorporated, Harrisburg, Pa.

[21] Appl. No.: 427,152

[22] Filed: Oct. 24, 1989

[51] Int. Cl.$^5$ ............................................. H04L 27/38
[52] U.S. Cl. ..................................... 329/308; 329/309; 375/81; 375/118; 375/120
[58] Field of Search ................ 329/304, 306, 307, 308, 329/309, 310, 302, 323, 325, 346; 375/80, 81, 82, 118, 120

[56] References Cited

U.S. PATENT DOCUMENTS

| | | | |
|---|---|---|---|
| 4,253,184 | 2/1981 | Gitlin et al. | 375/118 X |
| 4,344,176 | 8/1982 | Qureshi | 375/15 |
| 4,466,108 | 8/1984 | Rhodes | 375/118 X |
| 4,535,459 | 8/1985 | Hogge, Jr. | 375/80 |
| 4,625,180 | 11/1986 | Itaya et al. | 331/2 |
| 4,649,551 | 3/1987 | Sander et al. | 375/81 |
| 4,667,170 | 5/1987 | Lofgren et al. | 331/17 |
| 4,677,395 | 6/1987 | Baker | 331/25 |
| 4,689,581 | 8/1987 | Talbot | 331/1 A |
| 4,712,077 | 12/1987 | Ansell et al. | 331/25 |
| 4,809,306 | 2/1989 | Somer | 275/120 |

OTHER PUBLICATIONS

"Carrier Synchronization and Detection of QASK Signal Sets", by Simon and Smith, IEEE Transactions on Communications, vol. COM-22, No. 2, Feb. 1974, pp. 98-106.

"Offset Quadrature Communications with Decision-Feedback Carrier Synchronization", by Simon and Smith, IEEE Transactions on Communications, vol. COM-22, No. 10, Oct. 1974, pp. 1576-1584.

"A Bandwidth Compressive Modulation System Using Multi-Amplitude Minimum Shift Keying (MAMSK)", by Weber, et al., IEEE Transactions on Communications, vol. COM-26, No. 5, May 1978, pp. 543-551.

*Primary Examiner*—Siegfried H. Grimm
*Attorney, Agent, or Firm*—David L. Smith

[57] ABSTRACT

A digital demodulator or receiver (22) having an interface (24) for receiving an input signal modulated with digital data, a multiplier (26) for multiplying the input signal with a local oscillator signal (LOa-LOd) to generate a product signal, and an integrator (38) for periodically integrating the product signal to generate a sequence of integrated signals, each having an amplitude indicative of a respective portion of the digital data, operates in a SEARCH mode to supply acquisition reference signals (1xi, 1xq, 2xi, 2xq) to the multipliers (36). The resulting integrated values (Ia-Id) are proportional to the sine and cosine of the pahse ($\phi$) of the input signal. The polarities (Sa-Sd) of these integrated values (Ia-Id) are processed to estimate this phase ($\phi$) and to generate a reset signal (RESYNC) for the receiver (22) at the appropriate time.

11 Claims, 16 Drawing Sheets

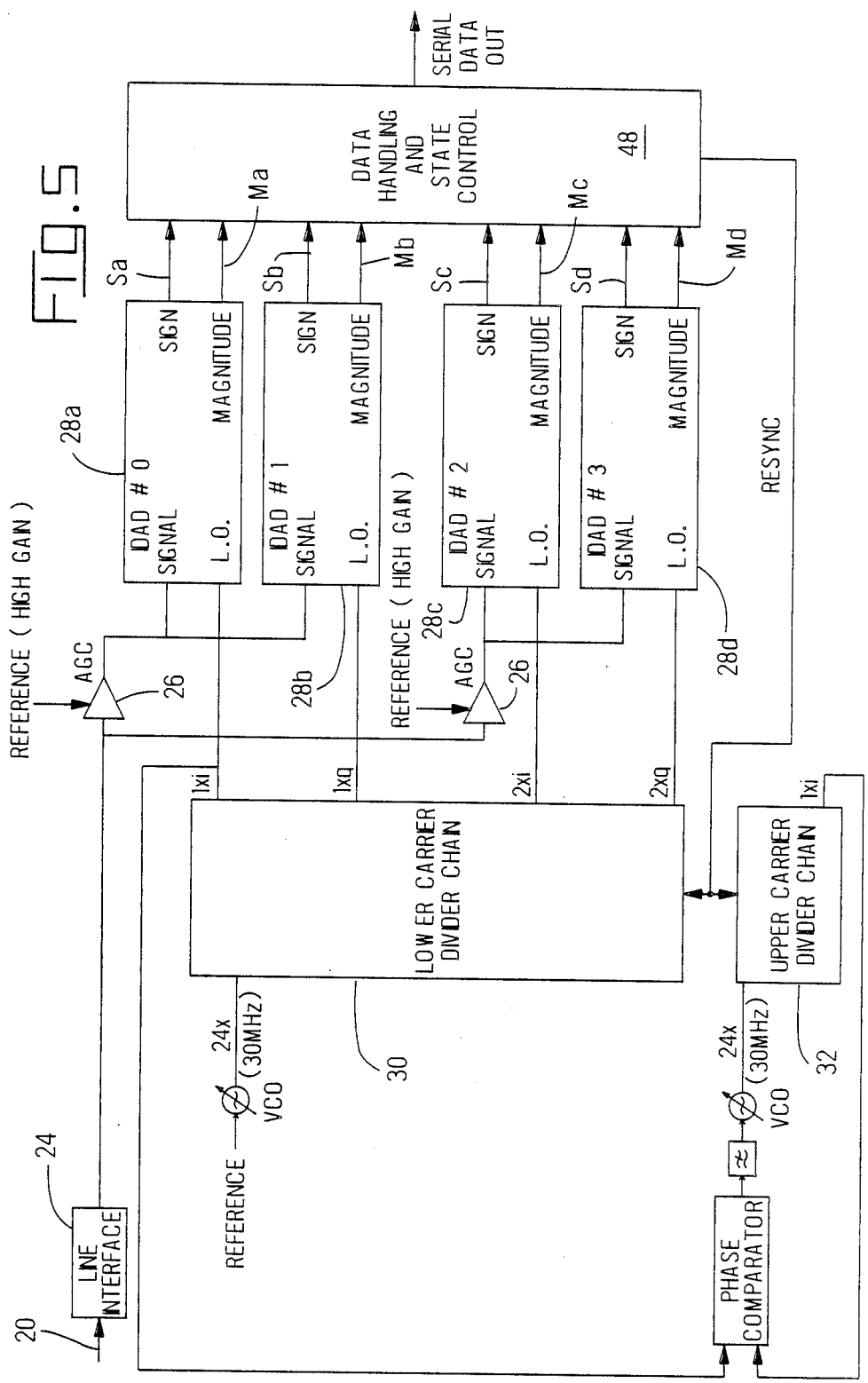

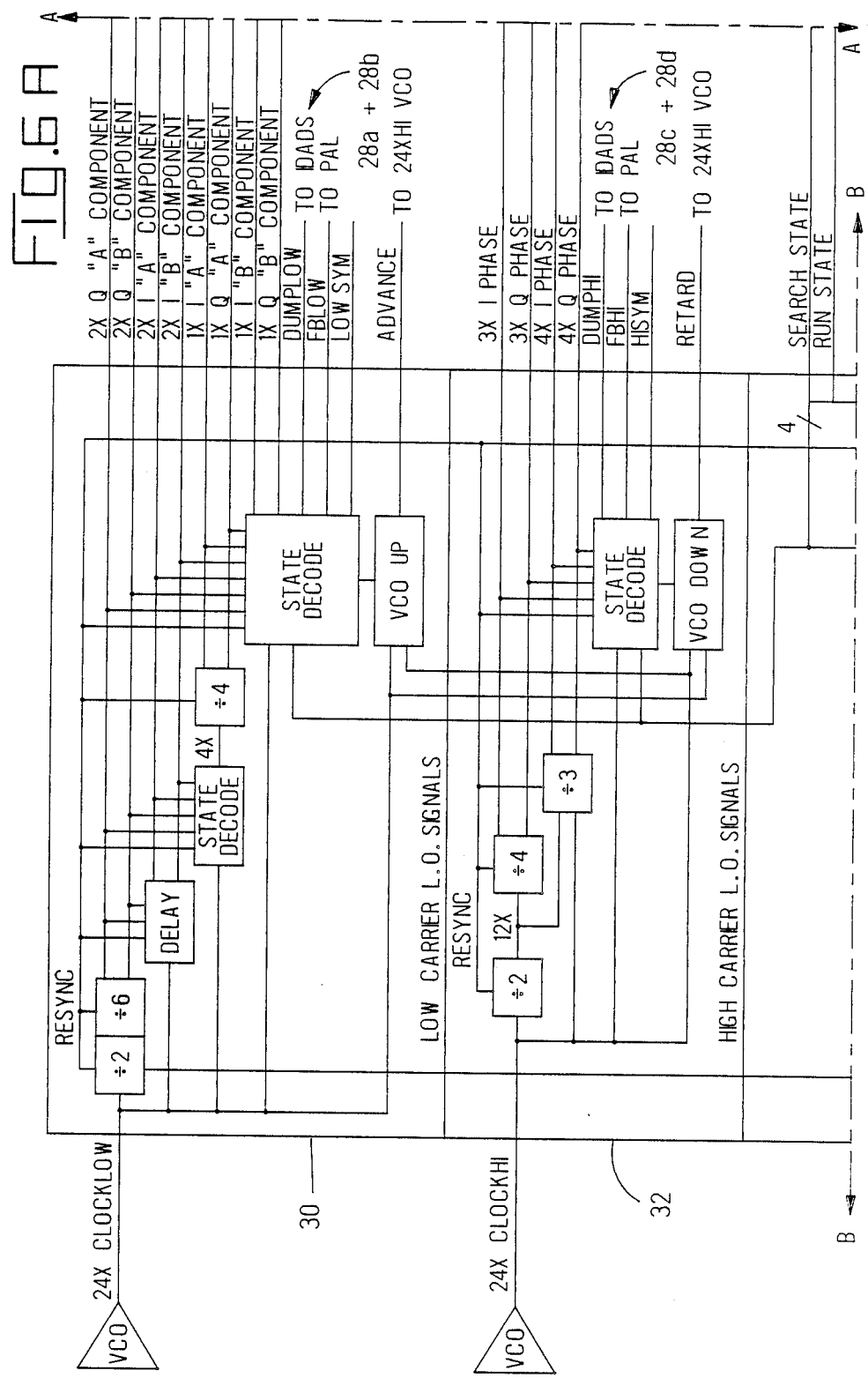

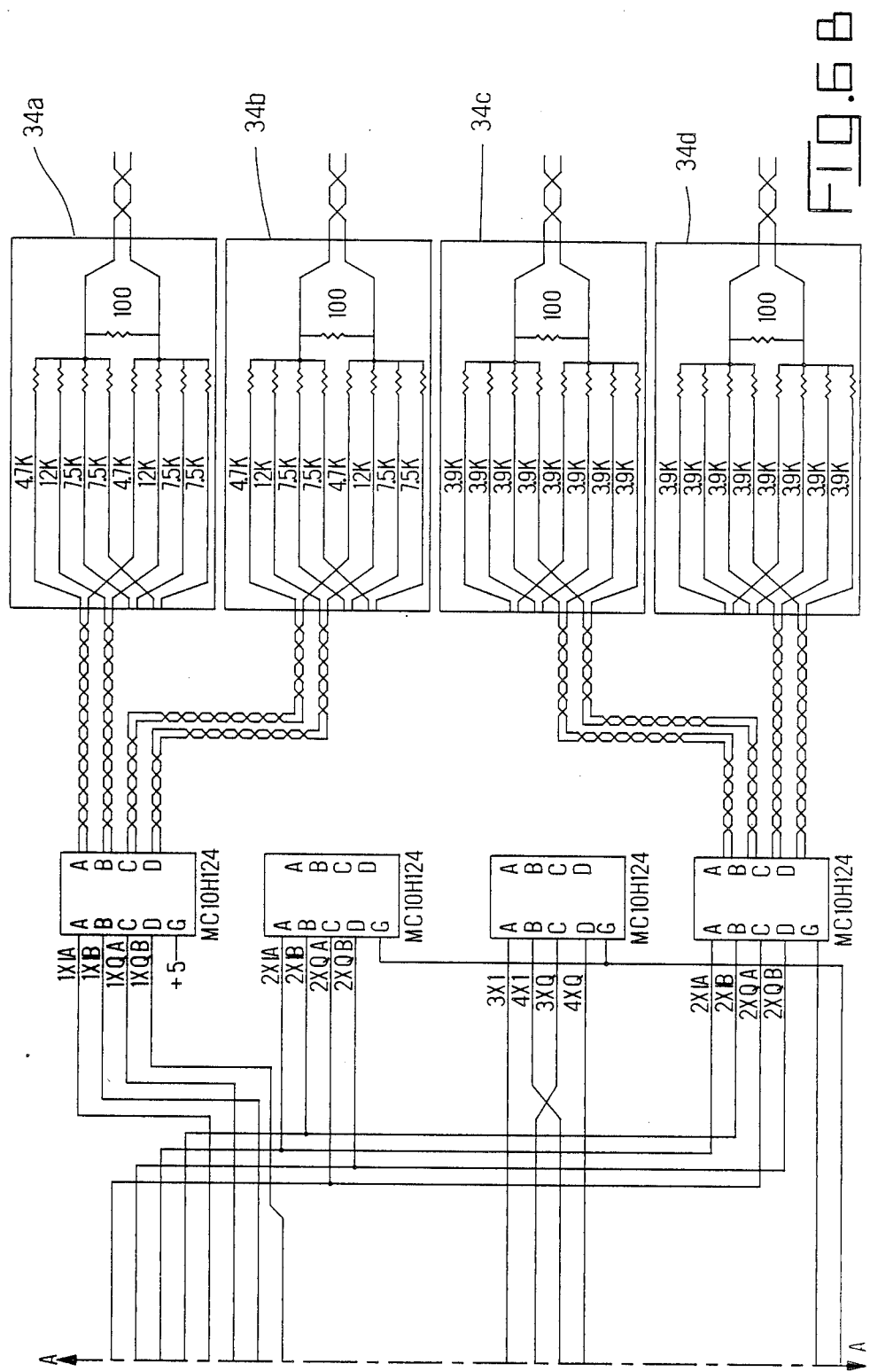

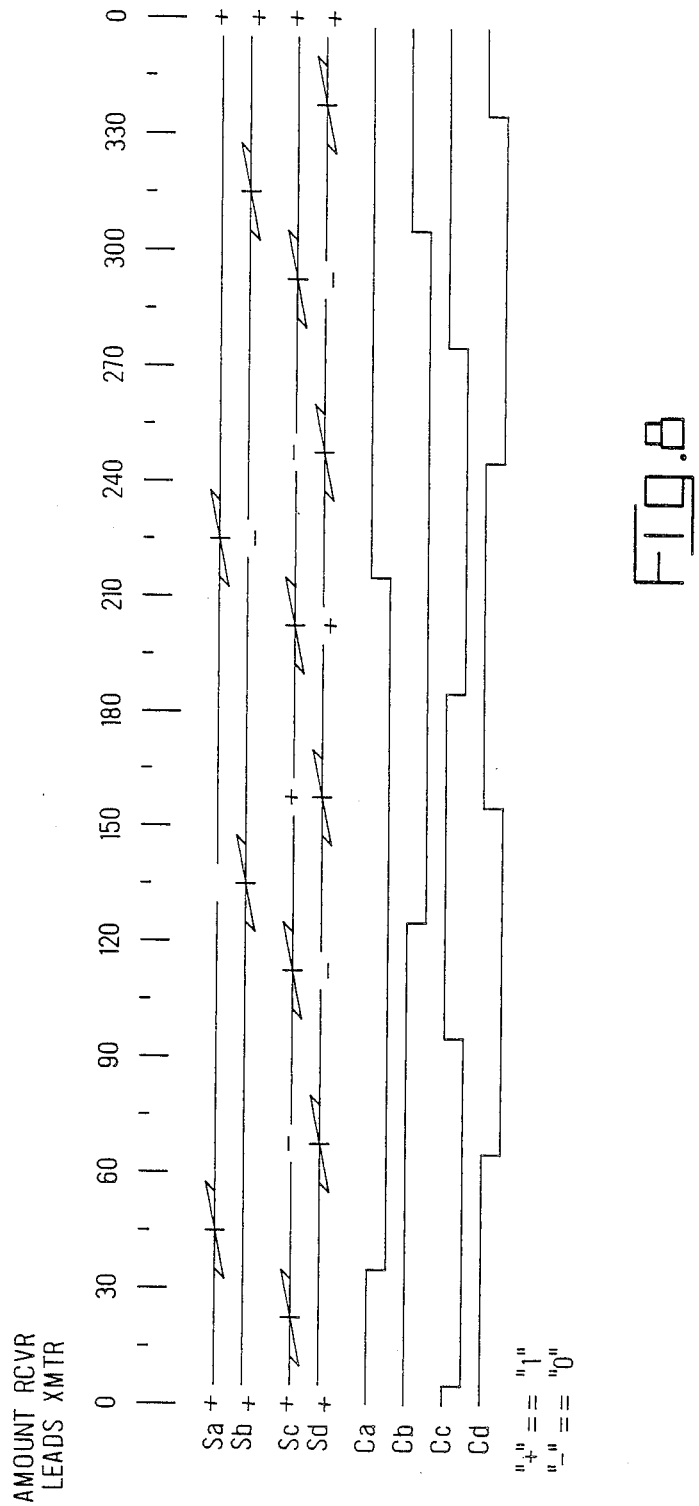

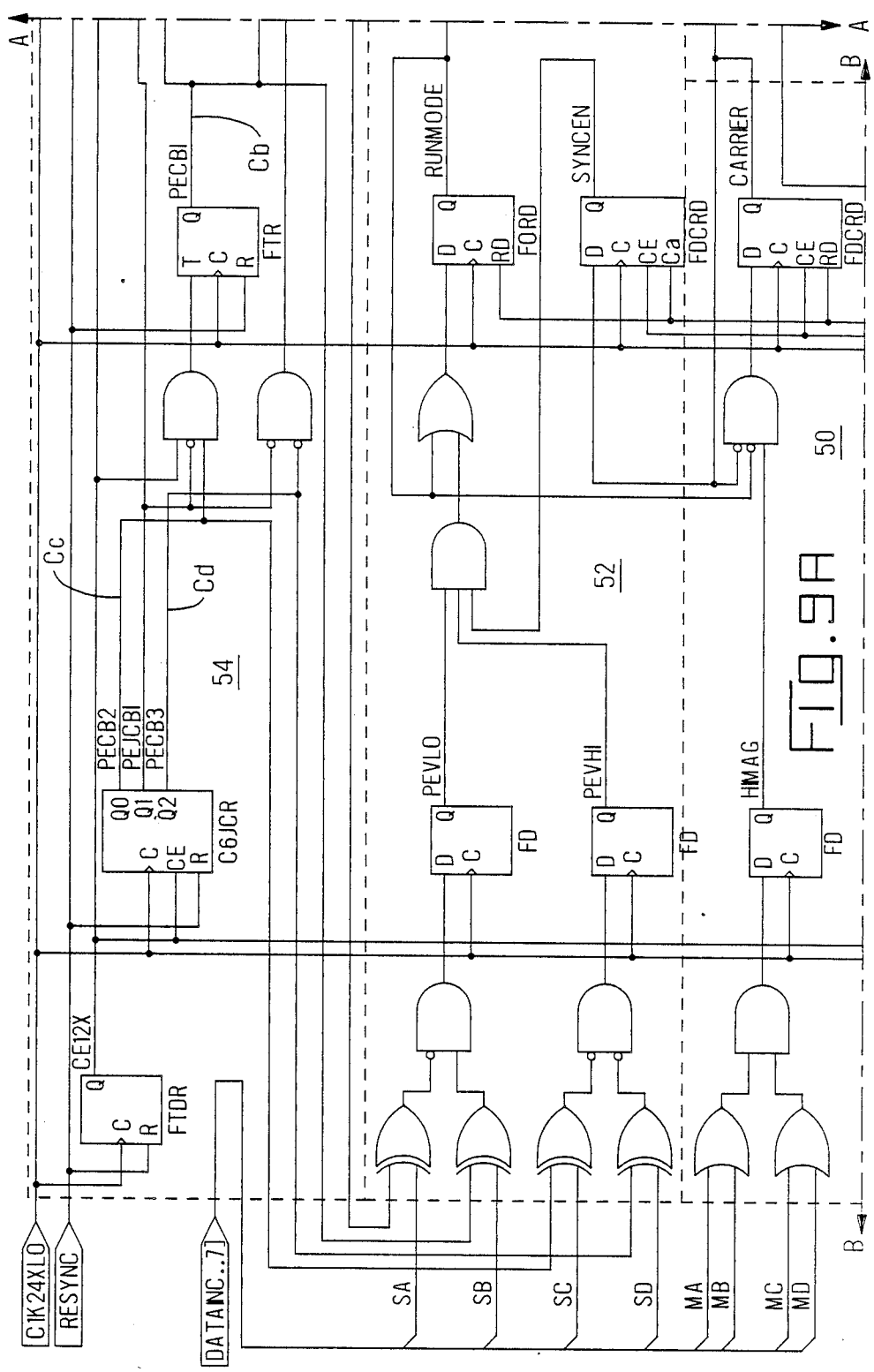

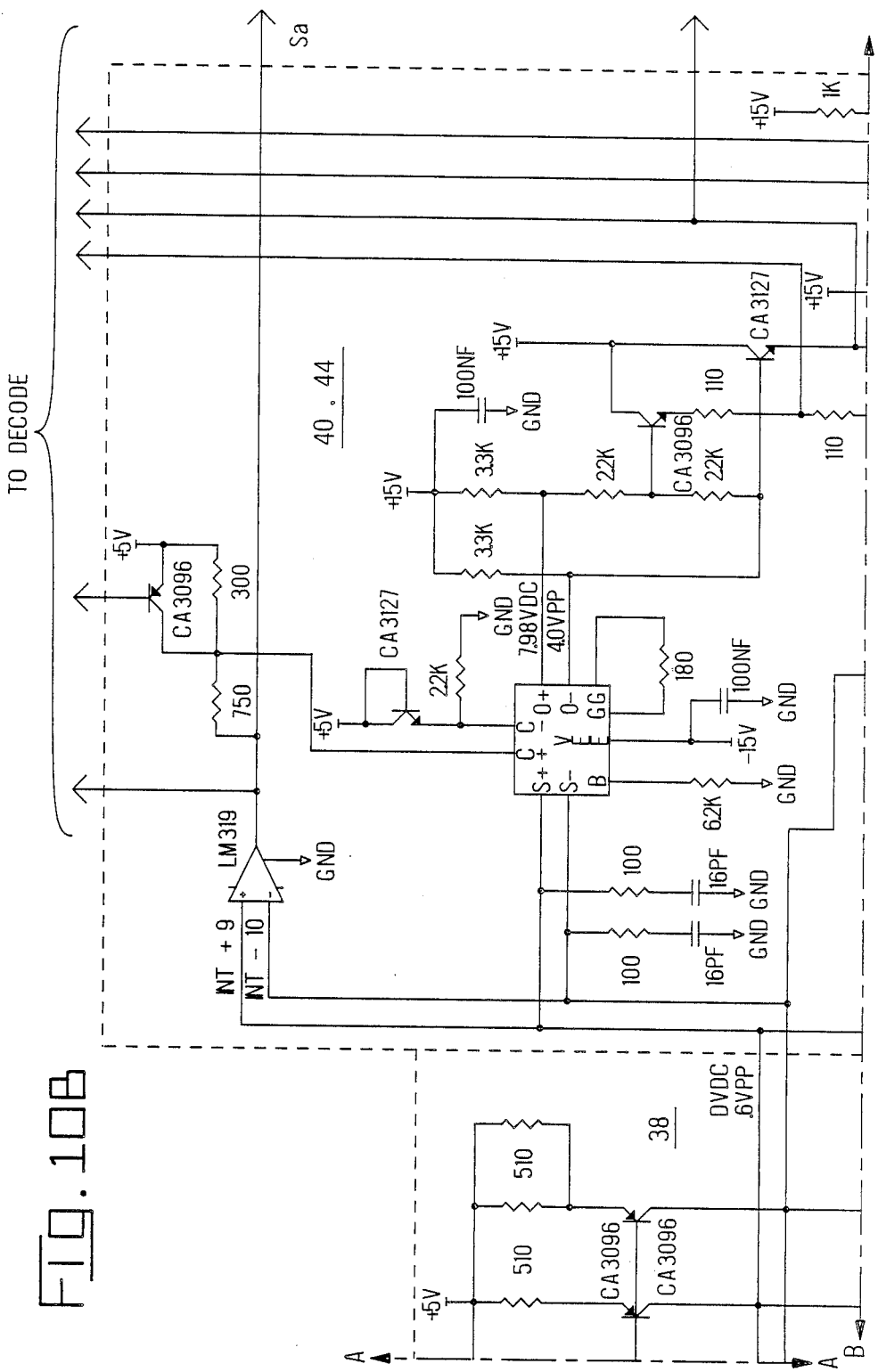

LOCAL OSCILLATOR SIGNAL PHASE ACQUISITION SYSTEM FOR DIGITAL DEMODULATOR

BACKGROUND OF THE INVENTION

This invention relates to a phase acquisition system for a local oscillator signal in a digital demodulator of the type comprising means for receiving an input signal modulated with digital data, means for multiplying the input signal with a plurality of mutually orthogonal demodulation reference signals to generate respective product signals, and means for periodically integrating the product signals separately to generate a plurality of respective sequences of integrated signals, each having an amplitude indicative of a respective portion of the digital data.

Digital demodulators of the general type described above are well known to those skilled in the art, as for example in quadrature amplitude modulation (QAM) systems. Typically, a plurality of separate component signals are combined to form a composite signal which is transmitted on a single signal channel, and each signal is orthogonal to the others and is amplitude modulated. When the received composite signal is multiplied by an appropriate local oscillator signal and the resulting product is integrated over an integral number of symbol periods, the resulting integration value is indicative of the amplitude of a respective one of the component signals of the composite signal.

Preferably, each of the component signals is sine wave modulated in order to eliminate high frequency components associated with square waves. For this reason, the local oscillator signals used as demodulation reference signals are also often sine wave modulated.

When the demodulator initially acquires an input composite signal, the frequency of the composite signal is known, but its phase is not. Data demodulation requires that the local oscillator signals which are used as demodulation reference signals must be synchronized in phase with the composite signal.

In the past, phase locked loops have been used to synchronize the reference signals with the composite signal. This approach works well in a steady state situation, where phase differences are small and conventional feedback techniques operate effectively. However, at signal acquisition the phase difference between the reference signals and the composite signal will often be large, and a conventional phase locked loop may take an excessively long time to synchronize the reference signals with the composite signal.

A need presently exists for an improved apparatus for rapidly estimating the phase of the input composite signal at acquisition of the input signal.

SUMMARY OF THE INVENTION

According to this invention, an improved means for estimating phase of the input signal at acquisition of the input signal is provided in a digital demodulator of the type described initially above. This improved estimating means comprises means for separately multiplying the input signal with a plurality of acquisition reference signals to generate a plurality of respective acquisition product signals, means for separately integrating the acquisition product signals periodically to generate a plurality of respective acquisition integrated signals, and means for processing the acquisition integrated signals to estimate a phase difference between at least one of the acquisition reference signals and the input signal. This estimated phase difference can then be used to synchronize the reference signals with the input signal approximately, thereby increasing the speed with which a phase locked loop can achieve precise synchronization.

Because the processing means is responsive to integrated signals rather than threshold crossings, the system described below provides excellent noise immunity. Nevertheless, the disclosed system provides the estimated phase difference in less than three symbol periods after the presence of a preamble is detected. This high speed response can be an important advantage where fast acquisition of phase is important.

BRIEF DESCRIPTION OF THE DRAWINGS

FIG. 5 is a block diagram of the receiver of FIG. 2 configured in the SEARCH mode.

FIGS. 6A-6C are a more detailed block diagram of selected portions of the receiver of FIG. 5.

FIG. 8 is a waveform diagram showing phase error determination and correction signals generated by the circuit of FIG. 6.

FIGS. 9A-9C are a detailed schematic diagram of the state control circuit of FIG. 6.

FIGS. 10A-10C are a detailed schematic diagram of portions of one of the IDAD's 28a-28d.

DETAILED DESCRIPTION OF THE PREFERRED EMBODIMENTS

Figure 1:
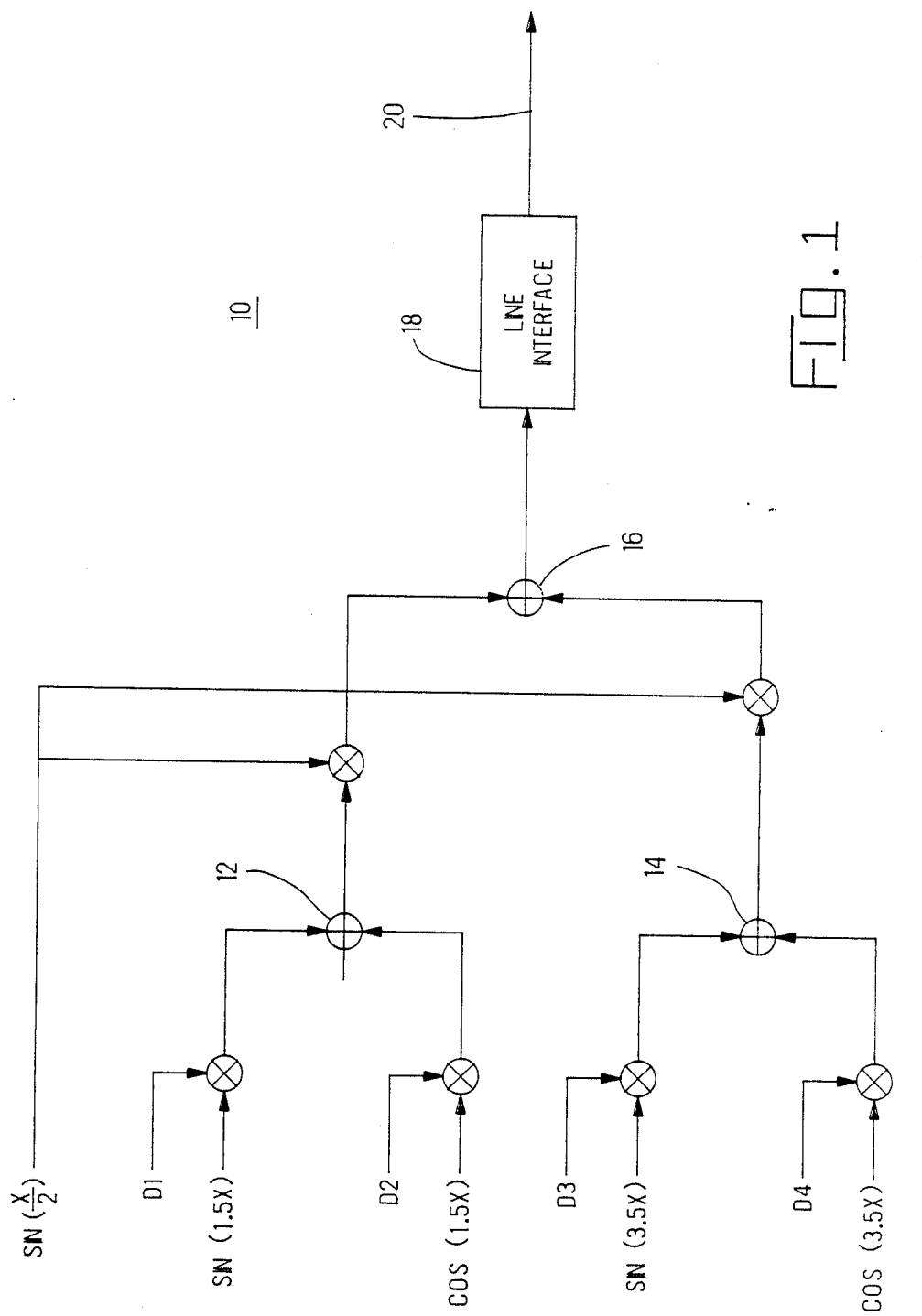
FIG. 1 is a block diagram of a transmitter for a dual carrier 16 QAM modem suitable for use with the preferred embodiment of this invention.

FIG. 1 shows a block diagram of a dual carrier transmitter 10 suitable for use with the receiver described below. The transmitter 10 receives four data input signals D1, D2, D3, D4. Each of these data input signals is a four level signal (+3, +1, −1, −3) and can be considered as encoding two bits, a sign bit and a magnitude bit. The transmitter 10 also receives five modulating signal inputs. The data signals D1 and D2 are multiplied by respective sine and cosine signals sin(1.5x) and cos(1.5x). In FIG. 1, x is equal to $2\pi t/T_s$, and in this example $T_s$ is equal to 800 nanoseconds. The data signals D3 and D4 are multiplied by respective modulating signals sin(3.5x) and cos(3.5x). In each case the data signal retains its value throughout any given transmitted symbol period. This period is equal to $T_s$, and during this period x varies from 0–2. The two lower frequency signals are summed at a summing junction 12 and the resulting signal is then multiplied with an envelope signal sin(x/2). Similarly, the two higher frequency signals are summed at a summing junction 14 and then multiplied by the envelope signal. The resulting signals are then summed in a third summing junction 16 to form a composite signal which is applied via a line interface 18 to a transmission medium such as a twisted pair 20.

It should be noted that the four modulating signals sin(1.5x), cos(1.5x), sin(3.5x), cos(3.5x) and the envelope signal sin(x/2) do not need to be adjusted in phase rapidly, and for this reason can be generated in a conventional manner, for example by shaping digitally generated square wave signals using standard integration and soft limiting techniques. Because each of the four components encodes one of four levels, the resulting composite signal can be characterized as a 16 quadrature amplitude modulated (16QAM) signal. The modulating signals at 1.5x and 3.5x are suppressed carriers, and the envelope at x/2 creates two side bands for each suppressed carrier. Thus, the composite signal is characterized by a frequency spectrum emphasizing the frequencies 1x, 2x, 3x and 4x. The transmitter 10 does not per se form part of this invention, and it has been described only to clarify the environment in which the present embodiment is used.

Figure 2:
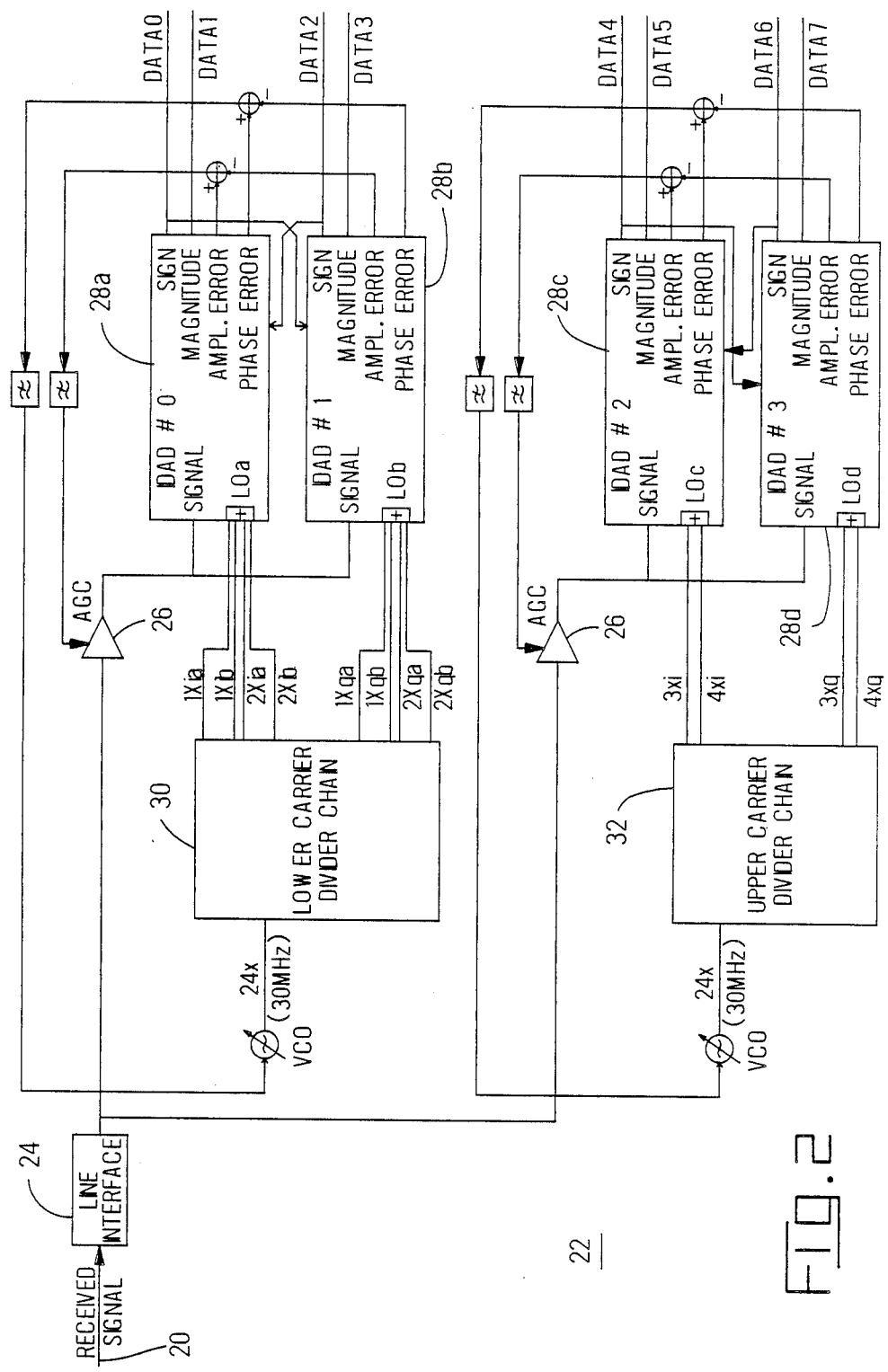
FIG. 2 is a block diagram of a receiver which is configured in the RUN mode and incorporates a presently preferred embodiment of this invention.

FIG. 2 shows a block diagram of a digital demodulator or receiver 22 (in the RUN mode) which incorporates a presently preferred embodiment of this invention. This receiver 22 is coupled to the twisted pair 20 via a line interface 24. The output of the line interface 24 is applied in parallel via automatic gain control amplifiers 26 to four IDAD's 28a-28d. In this connection, IDAD is an acronym for Integrate-Dump-Analog-to-Digital. In general, each of the IDAD's 28a-28d multiplies the received composite signal by a respective demodulation reference signal (local oscillator signal LOa-LOd), integrates the resulting product signal over an integral number of symbol periods, and then performs a two bit A-D conversion to decode two data bits from the resulting integrated value. The local oscillator signals for the two lower frequency IDAD's 28a, 28b are synthesized from logic signals directly generated by a lower carrier divider chain 30, and the local oscillator signals for the two higher frequency IDAD's 28c, 28d are synthesized from logic signals directly generated by an upper carrier divider chain 32.

Figure 3:
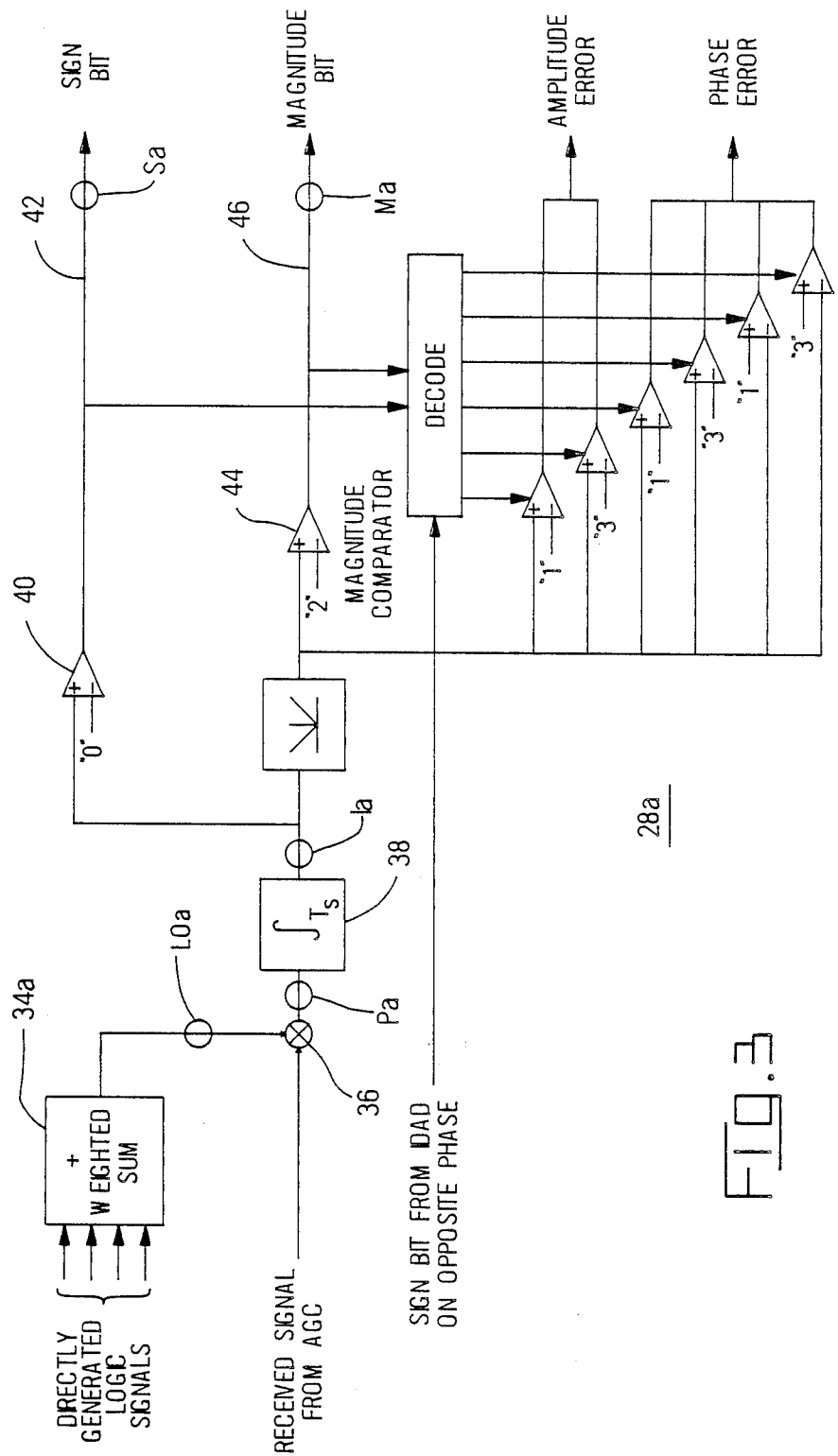
FIG. 3 is a block diagram of one of the IDAD's included in the receiver of FIG. 2.
Figure 4:
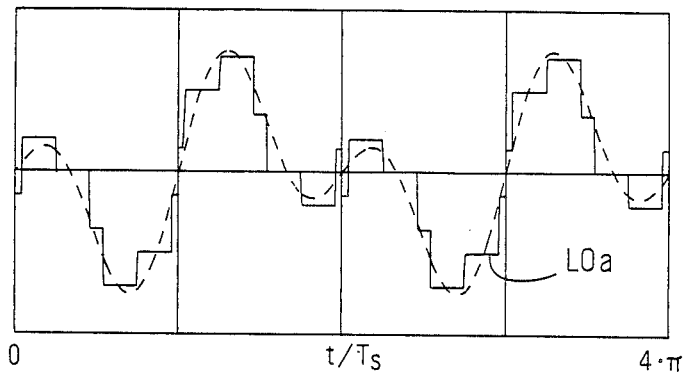
FIGS. 4A-4D are waveforms of four local oscillator signals used by the IDAD's 28a-28d for data demodulation when configured as shown in FIG. 2.
Figure 4:
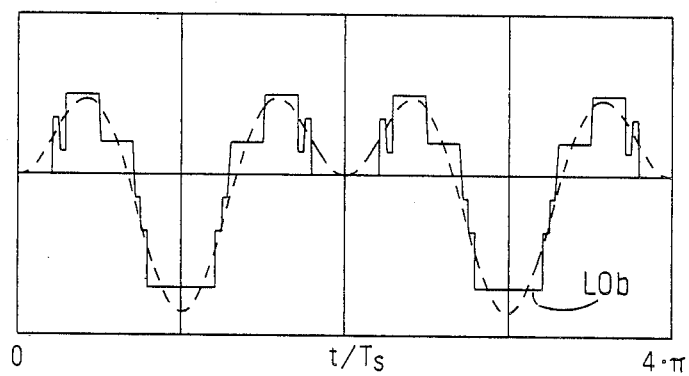
Figure 4:
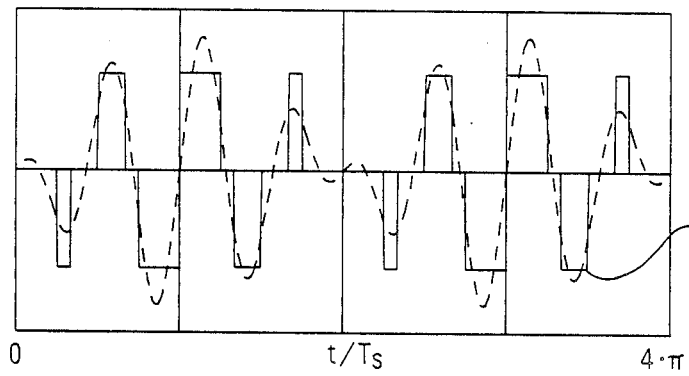
Figure 4:
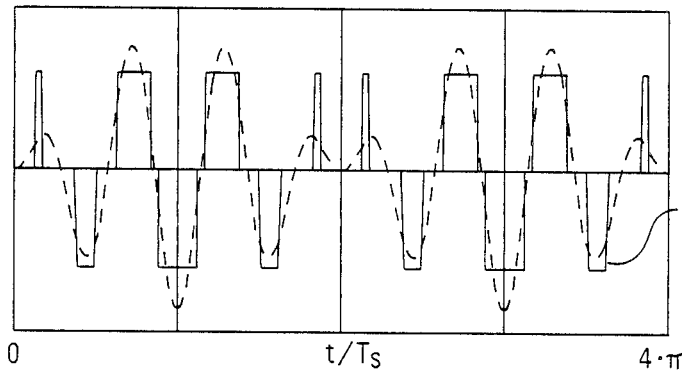

The four IDAD's 28a-28d are identical at the block one of the IDAD's 28a. As shown, directly generated logic signals from the divider chain 30 are summed in a weighted sum circuit 34a to produce a local oscillator signal LOa which is multiplied with the received composite signal at a multiplying junction 36. The resulting product signal Pa is integrated in an integrator 38 over a symbol period (800 nanoseconds in this embodiment). The resulting integrated value Ia is then applied to a sign comparator 40 which generates a sign bit Sa on line 42 in accordance with whether the integrated value Ia is positive or negative. The integrated value is also rectified and then applied as an input to a magnitude comparator 44 which applies a signal Ma on line 46 indicative of whether the magnitude is greater or less than two. The signals Sa, Ma on lines 42, 46 represent sign and magnitude bits. The remaining elements of FIG. 3 relate to features of the IDAD not pertinent to the present invention, and will not be described here.

In order for the IDAD's to function properly it is important that the four local oscillator signals L0a-L0d used in the four IDAD's be mutually orthogonal, and that each of them be shaped such that integration over a symbol period of the product of the composite signal with the local oscillator signal will result in an integrated value corresponding to one of the four input data signals D1-D4. In addition, during signal acquisition it is important that the phase angle of the local oscillator signals LOa-LOd be quickly adjustable to correspond to the phase angle of the composite signal received on the twisted pair 20.

The four demodulation reference signals (local oscillator signals LOa-LOd) for the four IDAD's 22a-22d are shown in FIGS. 4a-4d respectively. Preferably, each signal LOa-LOd is directly synthesized from directly generated logic signals, as described in detail in copending Pat. application Serial No. 07/427,281 filed Oct. 24, 1989, entitled "Local Oscillator Signal Generating System for Digital Demodulator" and filed concurrently herewith, which is hereby incorporated by reference for its disclosure of the structure and operation of the divider chains 30,32. In FIGS. 4a-4d solid lines are used for the signals LOa-LOd, and dot-dash lines are used for the sinusoidally modulated curves that are being approximated by the signals LOa-LOd. As explained in the above-identified application, the waveforms of the signals LOa-LOd are chosen to minimize undesired harmonics, yet they can be reset in phase almost instantaneously since they are synthesized from directly generated logic signals.

According to this invention, the four IDAD's 28a-28d are used both (1) to demodulate digital data from the composite signal as explained above, and (2) to obtain information used to synchronize the local oscillator signals LOa-LOd with the composite signal at acquisition of the composite signal.

The transmitter 10 precedes each transmission with a preamble of about 30 symbol periods, during which all four amplitudes (both phases of both carriers) are held at the +3 level. When the preamble is initially acquired, the frequency of the composite signal is known but the phase is not known. It is important to be able to determine this phase quickly and reliably.

The receiver 22 includes a fast acquisition system that obtains a reliable estimate of the phase of the incoming signal in two symbol periods, and then uses this estimate to approximately synchronize the local oscillator signals LOa-LOd with the incoming composite signal. Once the local oscillator signals LOa-LOd have been approximately synchronized, other systems incorporating phase locked loops improve and maintain synchronism between the local oscillator signals LOa-LOd and the composite signal. The original estimate is used to ensure that the phase error to be corrected by the phase locked loops is small, and in this way to ensure rapid convergence.

Figure 6C:
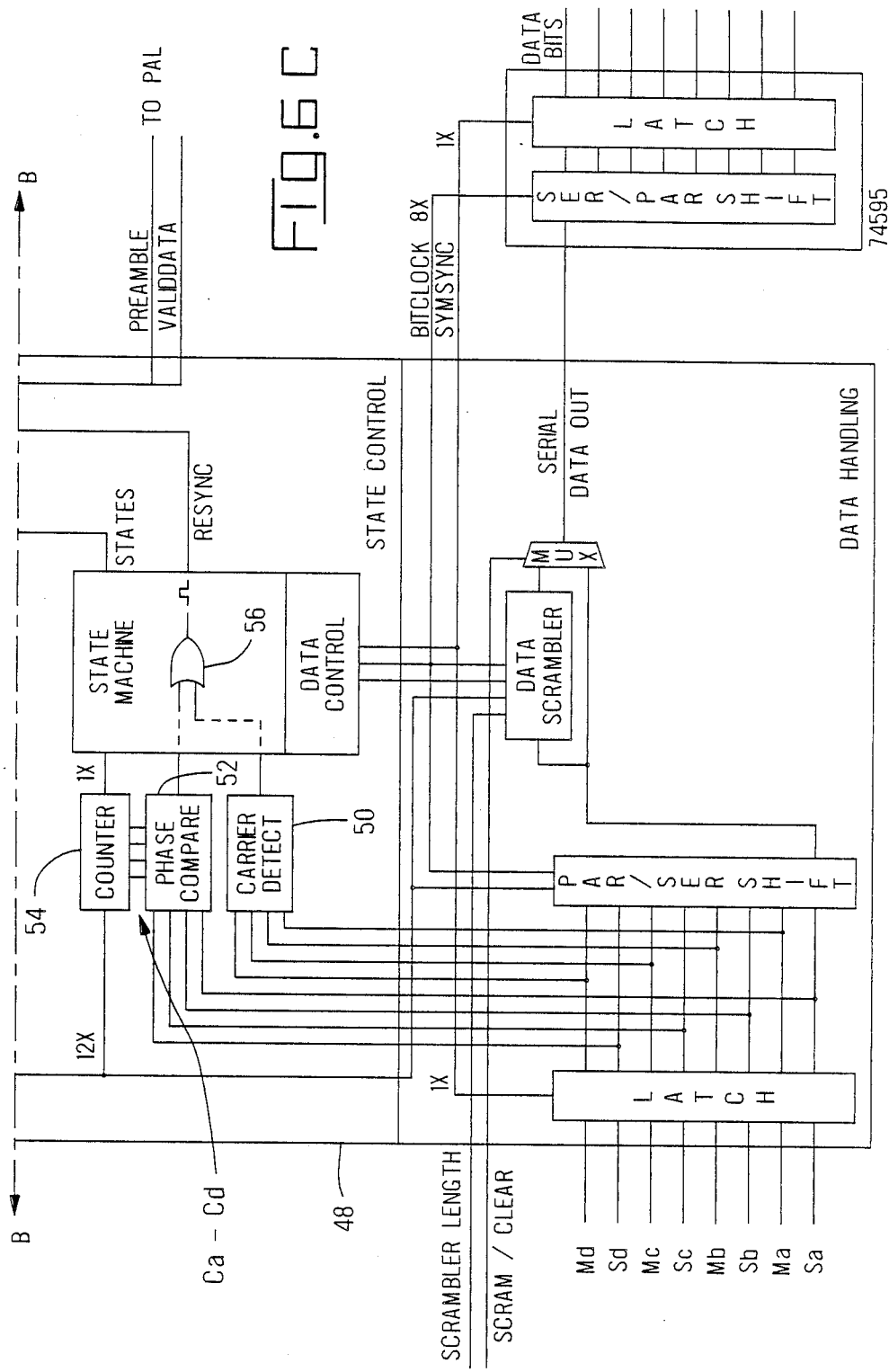
Figure 7:
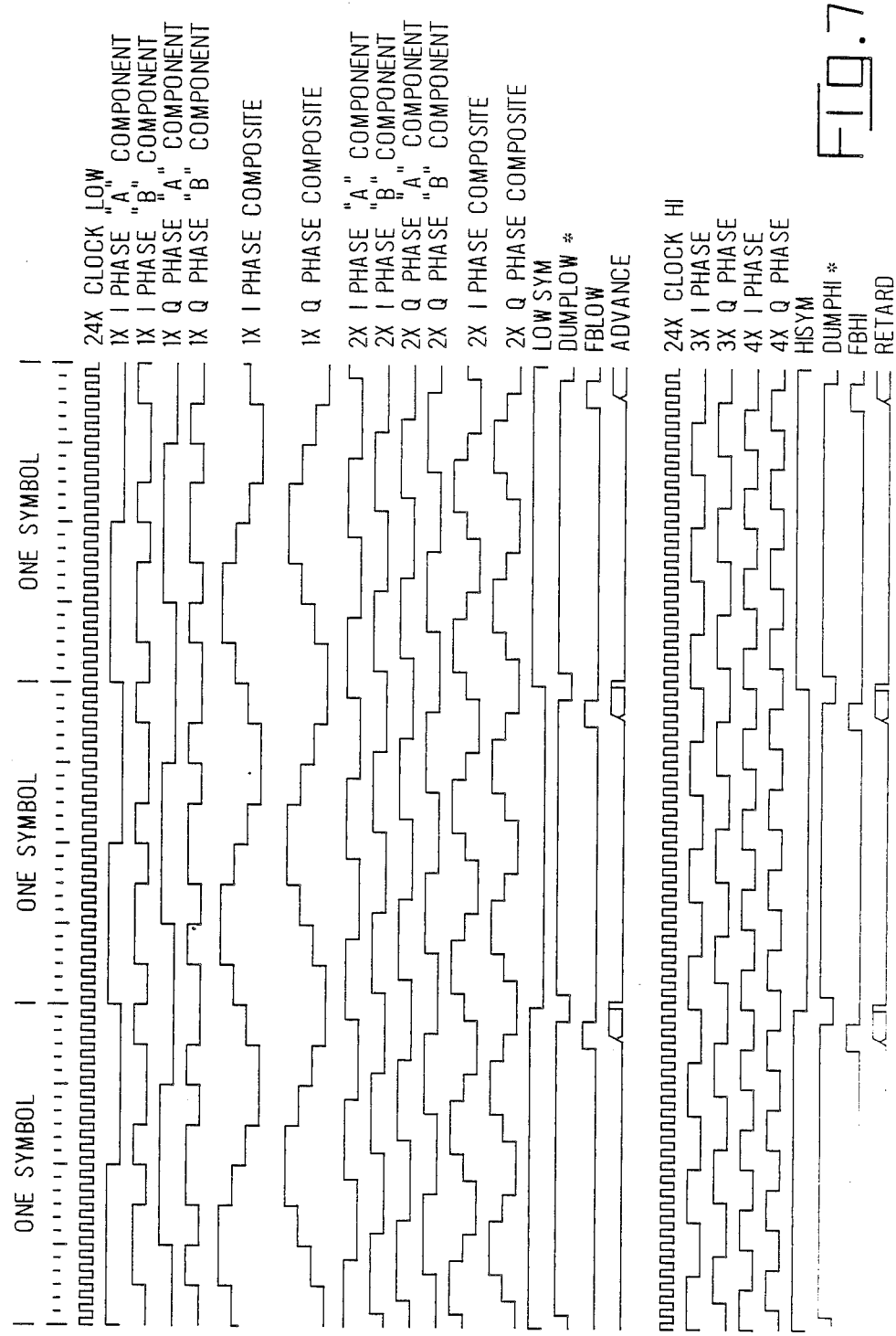
FIG. 7 is a waveform diagram showing reference signals generated by the circuit of FIG. 6.

Upon power up and between periods of data demodulation, the receiver 22 is configured in the SEARCH mode as shown in FIG. 5. In the search mode the four IDAD's 28a-28d receive acquisition reference signals 1xi, 1xq, 2xi, 2xq, respectively, as shown in FIG. 6. As explained below, this choice of acquisition reference signals allows the phase of the incoming composite signal to be estimated quickly and reliably by a data handling and state control circuit 48.

Figure 9B:
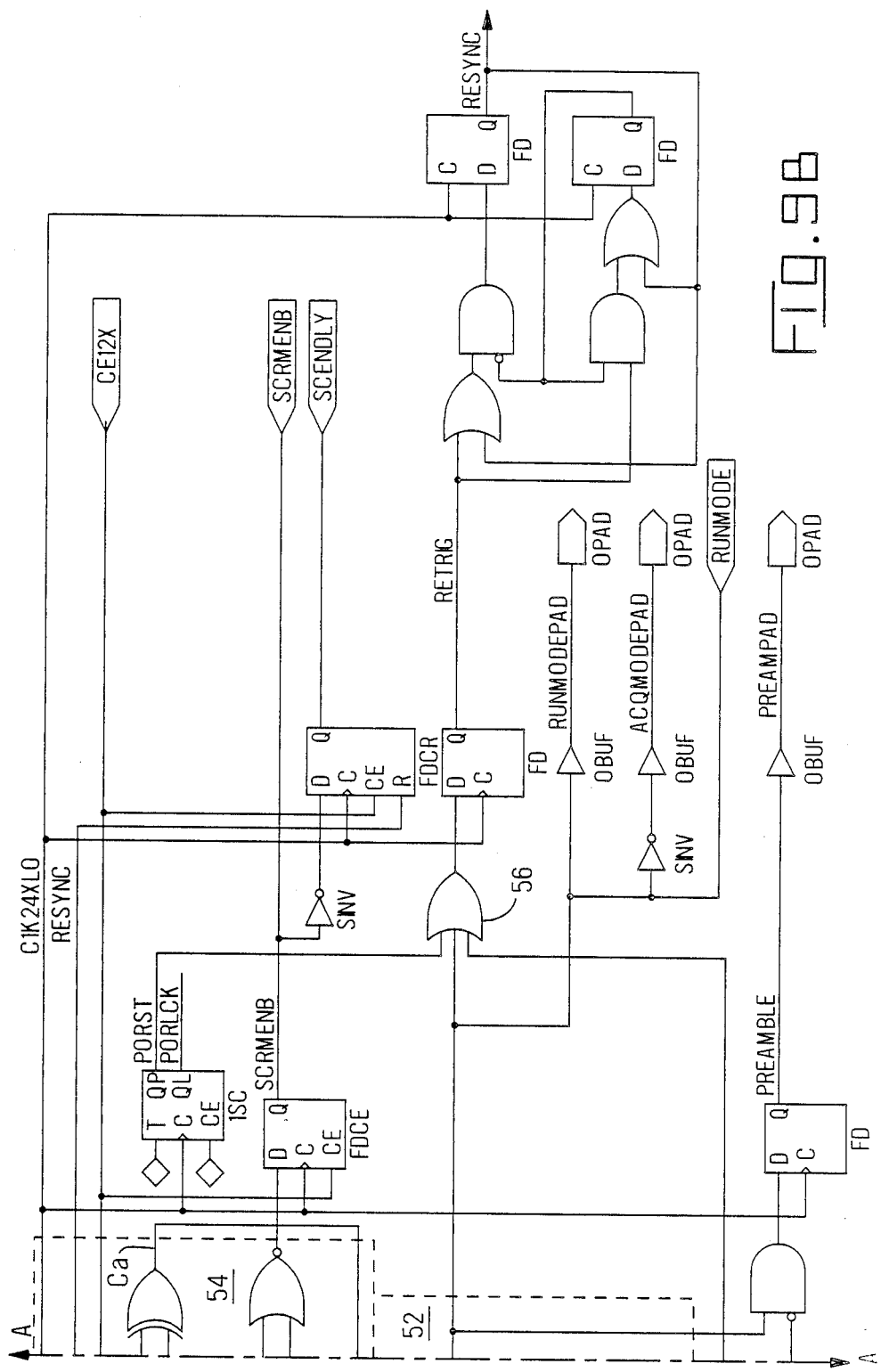
Figure 9C:
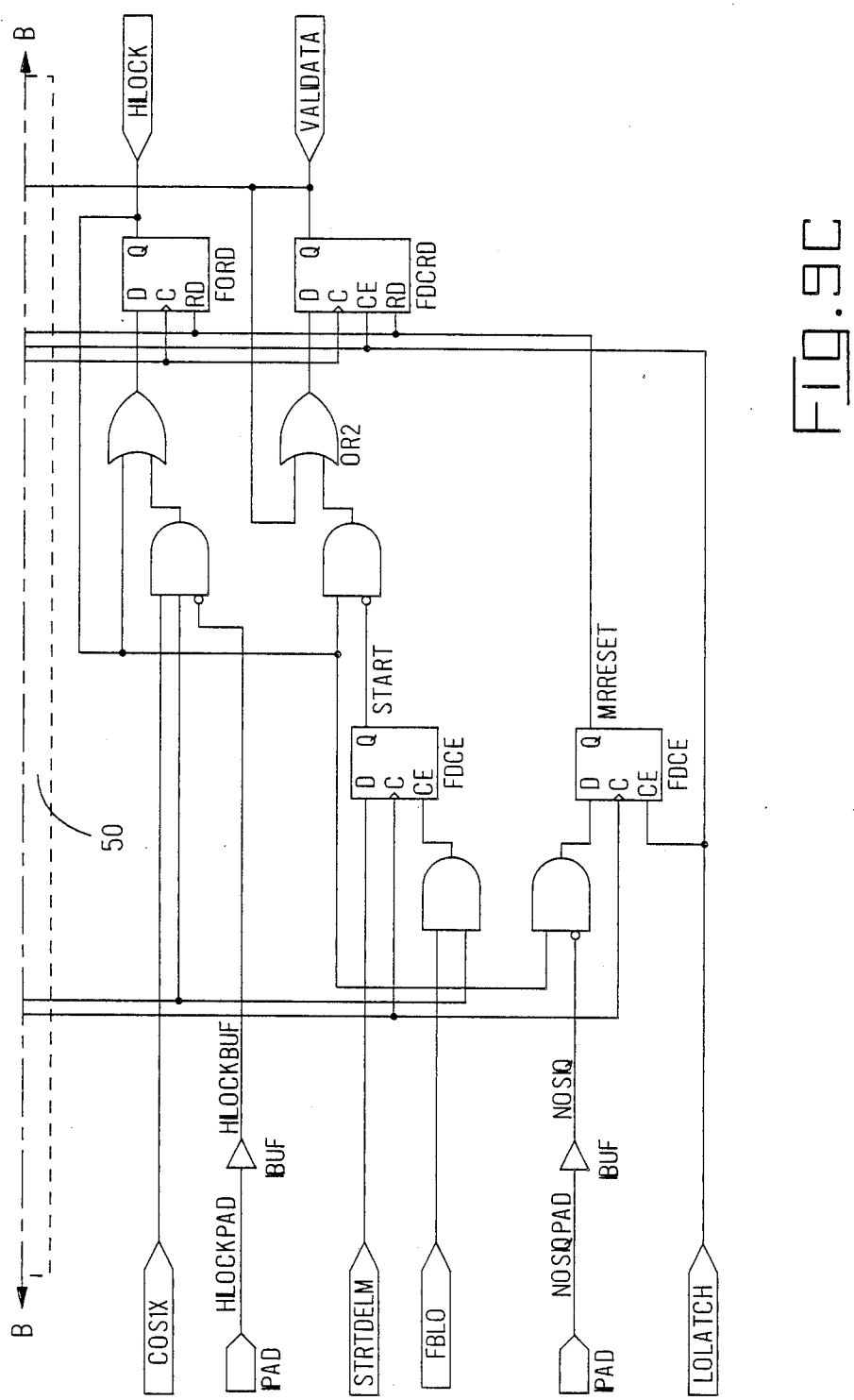

As mentioned above, data messages are preceded by a preamble in which all four magnitudes are +3. The first step is to detect the presence of a preamble. This is done by a carrier detect circuit 50 (FIG. 6) which monitors the four magnitude bits Ma-Md from the IDAD's 28a-28d. If there is no incoming signal present, the four magnitude bits Ma-Md will be in the low magnitude (logic zero) state. When a preamble signal is present, it is detected as a high magnitude (logic one) in at least one of the magnitude bits for each of the 1x and the 2x sidebands. Because the phase relationship between the transmitter 10 and the receiver 22 is unknown, the high magnitude may appear in either the I or the Q phase. The carrier detect circuit 50 includes a logic circuit as shown in FIG. 9 which receives as an input the magnitude bits Ma-Md from the four IDAD's 28a-28d. The logic circuit generates an output signal CARRIER when one or more of the magnitude bits Ma,Mb from IDAD's 28a and 28b is in the logic high state and one or more of the magnitude bits Mc,Md from the IDAD's 28c and 28d is in the logic high state. In other words, the preamble is considered to have been detected when a high magnitude signal (of either sign) is detected in both the 1x and the 2x sidebands (in either I or Q phase). In the SEARCH mode the IDAD's 28a-28d are controlled to integrate for two symbol periods, and the carrier detect decision is, therefore, reliable. Since it is based on integration results it is relatively noise immune.

Once the carrier detect circuit 50 has detected the preamble, the next two-symbol integration by the IDAD's is used to estimate the phase difference between the acquisition reference signals 1xi, 1xq, 2xi, 2xq and the composite signal received by the line interface 24. This is done by the phase compare circuit 52 and the counter 54. The phase compare circuit 52 receives as inputs the four sign bits Sa-Sd from the four IDAD's 28a-28d and compares them with four signals Ca-Cd generated by the counter 54, which is clocked at a rate of 12 times the symbol rate. When the circuit 52 detects that the four sign bits Sa-Sd are each equal to the respective signal Ca-Cd from the counter 54, the circuit 52 generates a signal applied to the OR gate 56. Assuming the carrier detect circuit 50 has detected a preamble, the OR gate 56 then causes a reset signal RESYNC to be generated that resets the divider chains 30,32 to redefine the symbol boundary as described in detail in the above identified application Ser. No. 427,281.

The counter 54 is arranged such that the counter bits Ca-Cd mimic the behavior of the sign bits Sa-Sd from the perspective of the receiver 22 leading the transmitter 10. As the counter 56 sweeps through 360° in phase in one symbol period, the counter bits Ca-Cd will equal the sign bits Sa-Sd at a time when the phase of the composite signal is approximately equal to zero. The reset signal RESYNC is then generated, and it resets the phase of the divider chains 30,32 to zero, thereby approximately synchronizing the phase of the divider chains 30,32 with the 1x and 2x components of the composite signal. FIG. 8 shows (1) the value of the four sign bits Sa-Sd as a function of phase difference between the receiver 22 and the transmitter 10 and (2) the sequence of counter bits Ca-Cd generated by the counter 56 as it is clocked at twelve times the symbol rate. As shown in FIG. 8, the sign bits Sa-Sd equal the respective counter bits Ca-Cd at a phase angle approximately equal to the amount the receiver 32 leads the transmitter 10.

The phase difference estimating system described above operates by measuring the sine and cosine components of the phase difference, and then by taking a signed arctangent function of the sine and cosine components to determine the phase difference. When the IDAD's 28a-28d are configured as shown in FIG. 5, the results of the four integrations can be represented as follows:

$$I(n,\theta) = \frac{2}{T} \sum_m \int_o^T \cos[m(wt + \phi)] \cdot \cos(nwt + \theta)dt \quad \text{(EQ1)}$$

$$= \cos(n\phi - \theta), \quad \text{(EQ2)}$$

where T is the symbol duration, w is $2\pi/T$, m and n are integers with $1 \leq m \leq 4$ and $1 \leq n \leq 2$, $\phi$ is the unknown phase of the incoming composite signal with respect to the receiver 22, $\phi$ is either 0 or $\pi/2$. The first cosine in the integrand represents one of the four frequency components of the preamble signal, and the second cosine in the integrand represents the acquisition reference signal applied to the four IDAD's 28a-28d.

From Equation 2 above, the integration results Ia-Id of the four IDAD's 28a-28d are as follows:

$$Ia = I(1,\pi/2) = \sin \phi$$

$$Ib = I(1,0) = \cos \phi$$

$$Ic = I(2,\pi/2) = \sin 2\phi$$

$$Id = I(2,0) = \cos 2\phi,$$

Ia/Ib and Ic/Id are equal to the the tangent of $\phi$ and $2\phi$, respectively. Either arctan (Ia/Ib) or arctan (Ic/Id) can be used to estimate the phase difference $\phi$.

The preferred embodiment described above approximates this approach in a particularly high speed, low cost manner. The two sign bits Sa, Sb from the IDAD's 28a, 28b indicate $\phi$ to a resolution of $\pi/2$, or one quarter symbol. The two sign bits Sc, Sd from the IDAD's 28c 28d indicate $\phi$ within a half symbol to a resolution of $\pi/4$ or one-eighth of a symbol. The sign bits Sa-Sd in effect provide a fast, inexpensive arctangent approximation. Sc and Sd improve resolution, while Sa and Sb are used for low resolution since an offset of a half symbol is indistinguishable using only Sc and Sd.

FIG. 8 graphs Sa-Sd as a function of the phase error $\phi$. For example, if $\phi$ is about equal to zero ($\pm 1/16$ of a symbol), all four of the sign bits Sa-Sd are positive, indicating that the receiver 22 is approximately synchronized with the transmitter 10. If the receiver 22 leads the transmitter by 180°, Sa and Sb will be negative and Sc and Sd will be positive. The counter bits Ca-Cd will not match this configuration until after six cycles of the 12x clock, or 180°. At this point the phase of the composite signal is approximately zero, and when the divider chains 30,32 are reset with the signal RESYNC the reference signals (including the local oscillator signals LOa-LOd) are reset to zero phase. In effect, the counter 54 imposes a variable delay, determined by the measured phase error as encoded in Sa-Sd, before the reset signal RESYNC is generated. This delay ensures that, once RESYNC is generated, the logic signals generated by the divider chains 30,32 (and therefore both the acquisition reference signals and the demodulation reference signals) are in phase (to within $\pm 1/16$ of a symbol) with the composite signal. From this point on, phase locked loops can quickly reduce phase errors to zero. The upper carrier is not used in the fast acquisition algorithm because group delay distortion for this application does not offset the symbol boundaries between the upper and lower carriers beyond the point where the upper carrier can be quickly captured by its phase locked loop (not shown).

In actual implementation, the delay from the recognition of a zero phase error (where Sa-Sd equal Ca-Cd) to the establishment of a new symbol boundary (after RESYNC has been asserted and released) is equal to one quarter of a symbol time. To correct for this delay, the counter 54 is advanced one quarter of a symbol, such that the values of Ca-Cd equal Sa-Sd one quarter of a symbol before the acquisition and demodulation reference signals are in phase with the received composite signal. This insures that at the point that RESYNC has been generated and a new symbol reference established by the divider chains 30,32, the acquisition reference signals and the demodulation reference signals are in phase to within ±1/16 of a symbol with the composite signal.

During operation of the system described above for estimating phase error, the automatic gain control amplifiers 26 are preferably operated at maximum gain. No assumptions are made about the amplitude of the incoming composite signal, and the phase measurement made as described above depends only on the sign bit output of the IDAD's 28a-28d. This does not imply that zero crossings of the composite signal are significant, since the sign bits are taken as the results of integrations. Furthermore, FIG. 8 shows that the sign bits change state one at a time, and in this sense form a Gray code. Thus, an error in reading one of the sign bits degrades accuracy to a limited extent.

The system described above for estimating phase error has a resolution of about ±1/16 of a symbol. Of course, alternate arrangements can be used (for example, working on the 3x side band or the 4x side band) to further improve resolution.

Another alternative implementation of the phase estimating system described above utilizes not only the sign bits Sa-Sd but also the integration values Ia-Id. In some applications it may actually be preferable to take an arctangent function of the analog quotient of the sine and cosine components, as suggested above. The preferred embodiment described above, however, provides the important advantages of minimizing additional hardware requirements, while operating at an extremely high speed in a reliable, noise immune fashion.

Figure 10A:
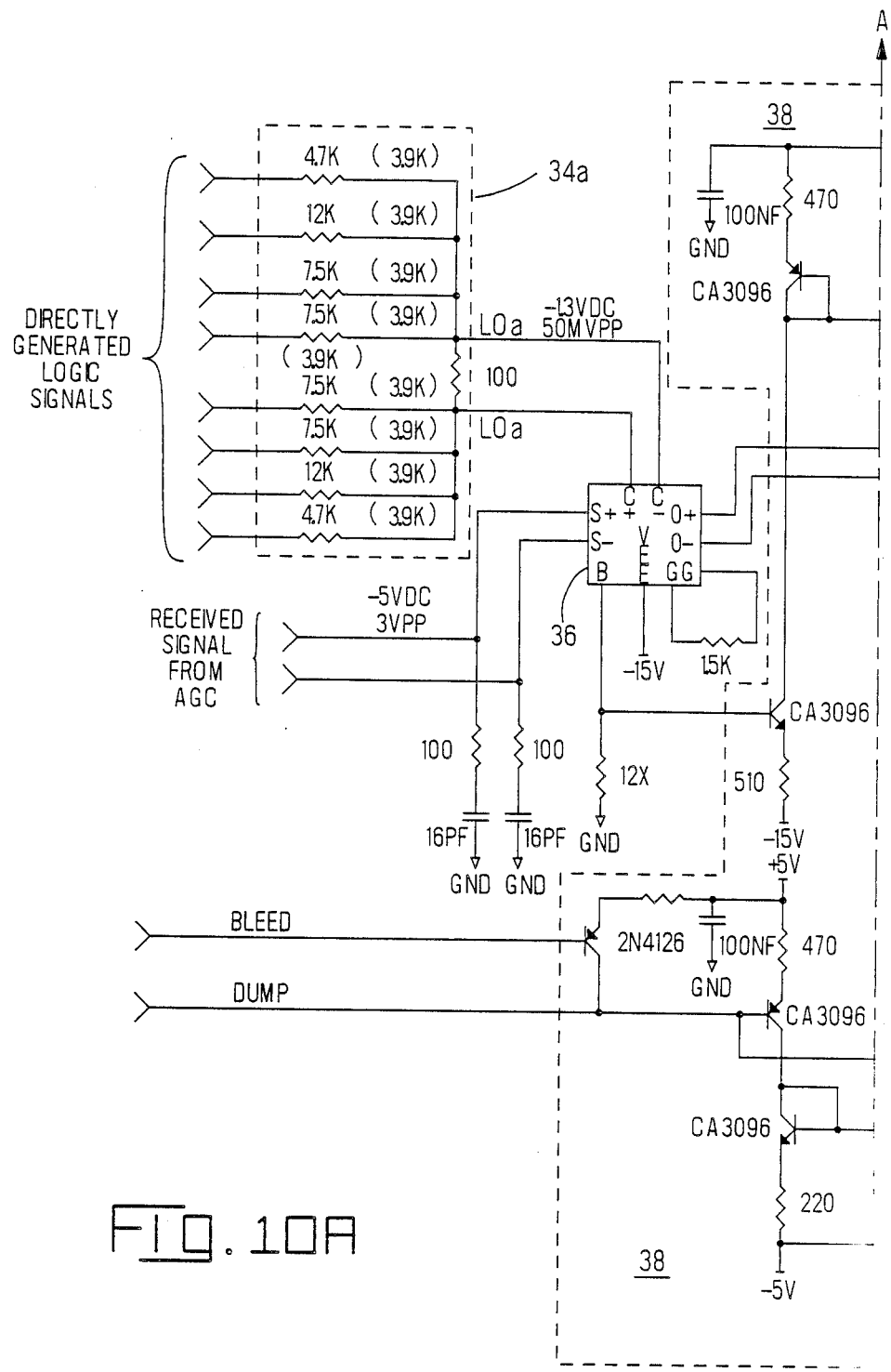
Figure 10C:
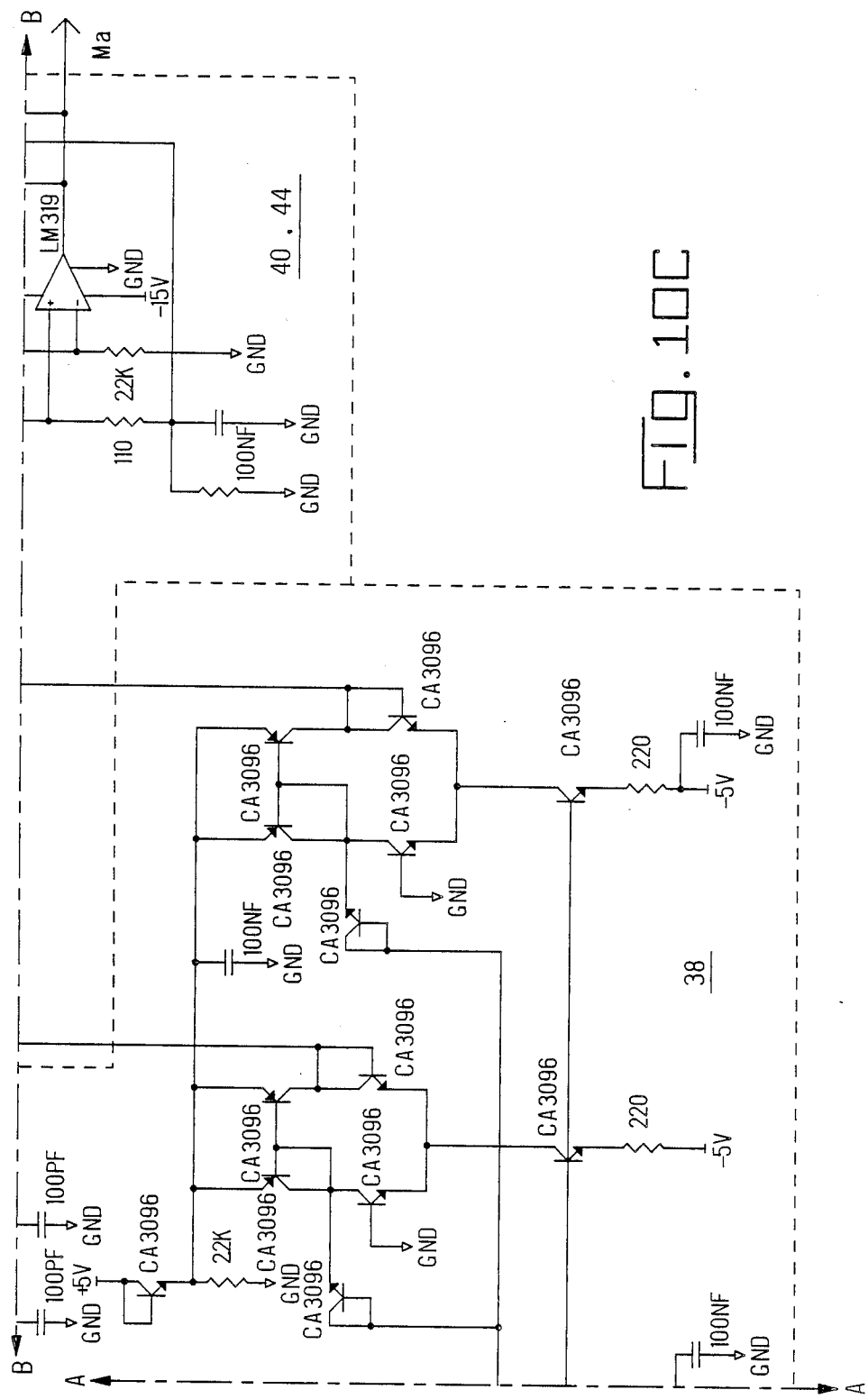

FIG. 9 provides a detailed schematic circuit for the presently preferred carrier detect circuit 50, the phase compare circuit 52, the counter 54 and the OR gate 56. FIG. 10 provides a detailed schematic circuit for the presently preferred multiplying junction 36, integrator 38 and comparators 40, 44.

It should be understood that the foregoing detailed description is illustrative and not limiting, and that the present invention is defined by the following claims.

We claim:

1. In a quadrature digital demodulator of the type comprising means for receiving an input signal modulated with digital data, means for multiplying the input signal with a plurality of mutually orthogonal demodulation reference signals to generate a plurality of respective product signals, means for integrating the product signals periodically to generate a plurality of respective sequences of integrated signals, each having an amplitude indicative of a respective portion of the digital data, the improvement comprising:
means for estimating phase of the input signal at acquisition of the input signal, said estimating means comprising:
means for multiplying the input signal with a plurality of acquisition reference signals to generate a plurality of respective acquisition product signals;
means for integrating the acquisition product signals to generate a plurality of respective acquisition integrated signals; and
means for processing the acquisition integrated signals to estimate a phase difference between at least one of the acquisition reference signals and the input signal.

2. The invention of claim 1 wherein the second mentioned multiplying means comprises means for supplying the first mentioned multiplying means with the acquisition reference signals in substitution for the demodulation reference signals.

3. The invention of claim 1 wherein the acquisition reference signals are selected such that a selected pair of the acquisition integrated signals corresponds to the sine and the cosine of the phase difference, respectively.

4. The invention of claim 1 wherein the processing means comprises:
means for determining polarity signals indicative of polarities of the respective acquisition integrated signals; and
means for utilizing the polarity signals to delay generation of a reset signal by a time period corresponding to the phase difference.

5. The invention of claim 1 wherein the acquisition reference signals are selected such that a selected pair of the acquisition integrated signals corresponds to the sine and the cosine of the phase difference, respectively.

6. The invention of claim 5 wherein the processing means comprises means for taking an arctangent function of the selected pair of acquisition integrated signals.

7. In a quadrature digital demodulator of the type comprising means for receiving an input signal modulated with digital data, means for multiplying the input signal with a plurality of mutually orthogonal demodulation reference signals to generate a plurality of respective product signals, means for integrating the product signals periodically to generate a plurality of respective sequences of integrated signals, each having an amplitude indicative of a respective portion of the digital data, the improvement comprising:
means for generating a plurality of acquisition reference signals;
a plurality of multipliers responsive to the input signal and the acquisition reference signals to generate a plurality of respective acquisition product signals;
a plurality of integrators for separately integrating the acquisition product signals to generate a plurality of respective acquisition integrated signals;
means for generating a plurality of sign signals, each indicative of polarity of a respective one of the acquisition integrated signals;
means, responsive to the sign signals, for generating a synchronization signal at a time determined at least in part by the sign signals.

8. The invention of claim 7 wherein the generating means comprises:
a counter clocked at a frequency greater than that of the acquisition reference signals, said counter comprising means for generating a plurality of counter signals in a sequence corresponding to a pattern formed by the sign bits as a function of increasing phase difference between the input signal and the acquisition reference signals.

9. The invention of claim 8 wherein the plurality of sign bits comprises four sign bits.

10. The invention of claim 8 wherein the multipliers are included in the multiplying means.

11. The invention of claim 8 wherein the integrators are included in the integrating means.

* * * * *